UNITED STATES PATENT OFFICE.

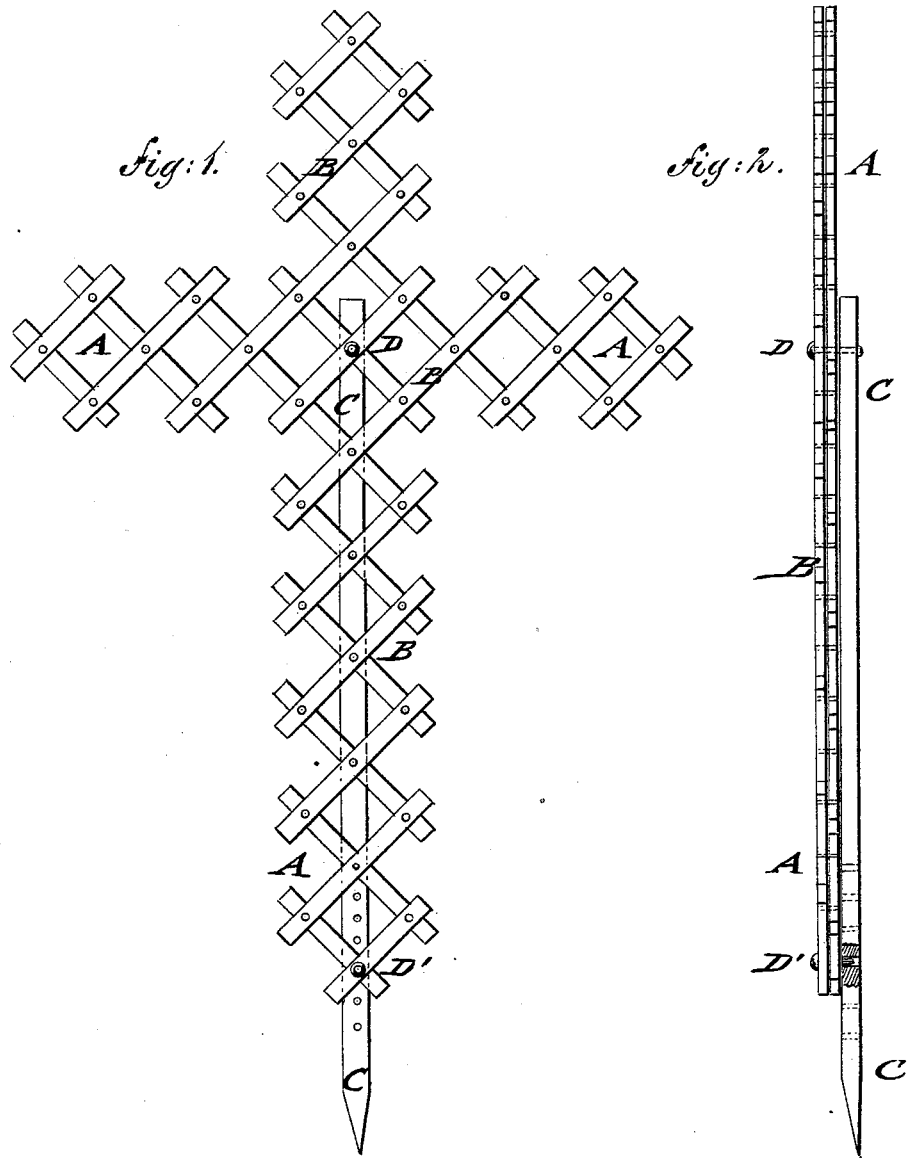

CHARLES H. WESTCOTT, OF SENECA FALLS, NEW YORK.

IMPROVEMENT IN FLOWER-TRELLISES.

Specification forming part of Letters Patent No. 183,611, dated October 24, 1876; application filed August 14, 1876.

*To all whom it may concern:*

Be it known that I, CHARLES H. WESTCOTT, of Seneca Falls, in the county of Seneca and State of New York, have invented a new and Improved Flower-Trellis, of which the following is a specification:

In the accompanying drawing, Figure 1 represents a front view, and Fig. 2 a side view, partly in section, of my improved flower-trellis arranged in the form of a cross.

Similar letters of reference indicate corresponding parts.

The invention relates to improved styles of neat and elegant trellises for flowers and other horticultural purposes.

The invention consists of a frame-work of pivoted strips, arranged in the nature of lazy-tongs, and applied in suitable manner to one or more supporting-stakes.

In the drawing, A represents a frame-work, which is formed of a number of strips, B, of black walnut or other suitable material, pivoted together in the form of lazy-tongs, so as to be readily folded into small compass or opened. The frame-work A is applied to one or more stakes, C, with pointed ends, which are placed into the ground. The frame A is arranged thereon in such a manner as to swing on a pivot-point, D, and be fastened at another point by a detachable pin, D'. This allows the folding up of the frame-work on the stake into smaller space, for more convenient shipment, and the ready opening and adjusting when desired for use.

The lazy-tongs frame A folds closely together, and may be spread to varying width and height on the supporting-stake C by providing a number of holes, into which the fastening-pin D' may be placed, as shown in Figs. 1 and 2.

When the trellis is placed in position in the flower-pot or garden, it forms a neat and ornamental device for training the flowers, vines, &c., into a variety of pleasing and beautiful shapes.

Having thus described my invention, I claim as new and desire to secure by Letters Patent—

A flower-trellis formed, as shown, of two or more flexible lattice-frames, A B, pivoted at the same point D, and fastened detachably at D' on the stake C, substantially as shown and described.

CHARLES H. WESTCOTT.

Witnesses:
FRANK WESTCOTT,
CHAS. L. ZACHARIE.